Feb. 21, 1967 J. T. NICOSIA 3,305,296
MOTION PICTURE PROJECTOR
Filed Feb. 5, 1964 4 Sheets-Sheet 1
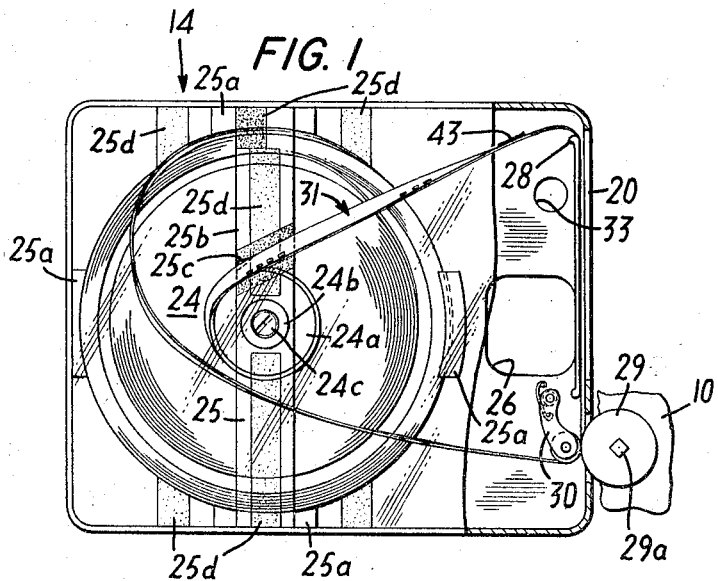
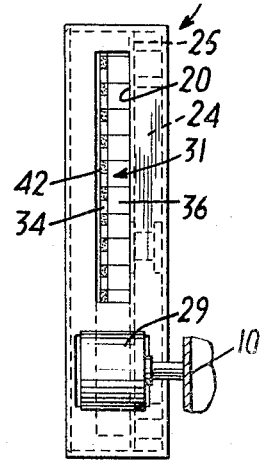
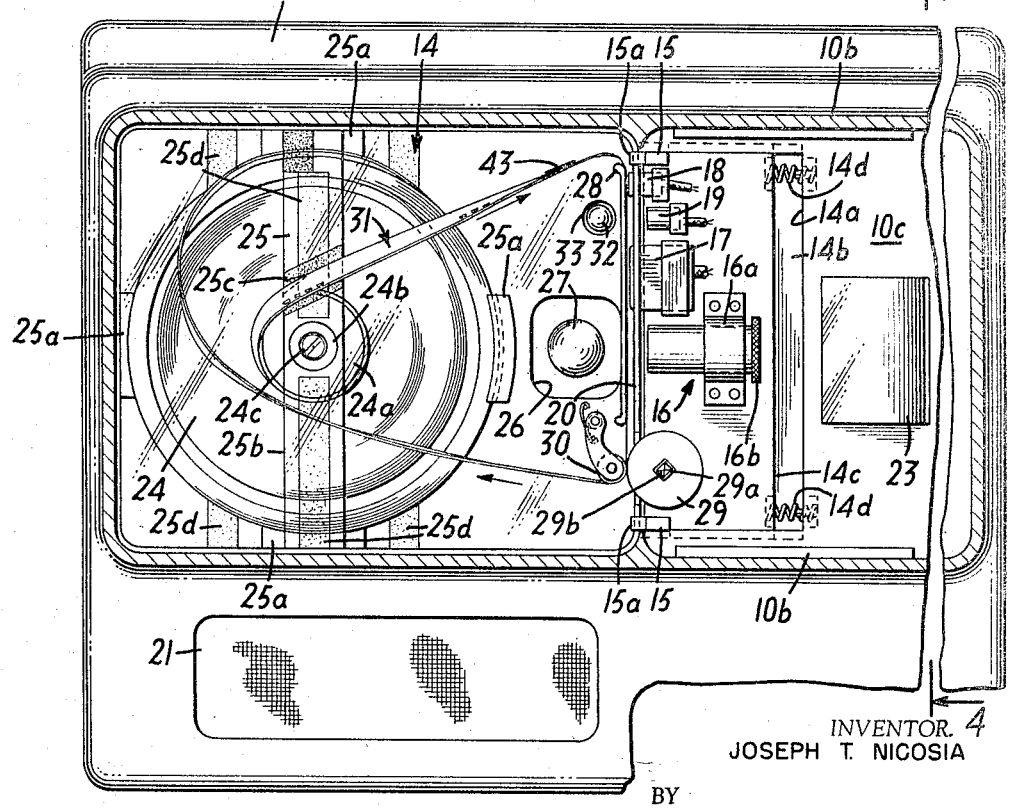
INVENTOR.
JOSEPH T. NICOSIA
BY
his ATTORNEYS Feb. 21, 1967  J. T. NICOSIA  3,305,296
MOTION PICTURE PROJECTOR
Filed Feb. 5, 1964   4 Sheets-Sheet 2

INVENTOR.
JOSEPH T. NICOSIA
BY
his ATTORNEYS

Feb. 21, 1967   J. T. NICOSIA   3,305,296
MOTION PICTURE PROJECTOR
Filed Feb. 5, 1964   4 Sheets-Sheet 3

INVENTOR.
JOSEPH T. NICOSIA
BY
his ATTORNEYS

Feb. 21, 1967 J. T. NICOSIA 3,305,296
MOTION PICTURE PROJECTOR
Filed Feb. 5, 1964 4 Sheets-Sheet 4

INVENTOR.
JOSEPH T. NICOSIA
BY
his ATTORNEYS

United States Patent Office 3,305,296
Patented Feb. 21, 1967

3,305,296
MOTION PICTURE PROJECTOR
Joseph T. Nicosia, 13 Hileen Drive,
Kings Park, N.Y. 11754
Filed Feb. 5, 1964, Ser. No. 342,656
18 Claims. (Cl. 352—129)

This invention relates to improvements in film projection apparatus, and more particularly, to an improved film projection device combining insertable film cartridges with stroboscopic film illumination, sound reproduction, and the like.

Some presently available film viewing and motion picture projection devices are unable to produce unusual or unique sensory effects and consequently lack versatility. Some film viewing devices, moreover, have no provision for rapid film changes, for stereoscopic film projection, for merging composite images, for film shifting or for showing several reels of film in sequence.

The use of ordinary, continuously burning projection lamps in enclosed viewing device housings presents a further operational hazard. The considerable heat generated by those conventional lamps cannot be dissipated at a relatively cool temperature by the limited air circulation available within the viewing device housings. Consequently, equilibrium between heat generation and heat dissipation is not reached until the temperature is so high as to substantially shorten projector bulb life and to occasionally cause portions of the film to burn.

The present invention overcomes these inherent limitations in available viewing devices. A motion picture projector or film viewer according to the present invention is characterized by one or more film cartridges insertable within the housing to permit rapid film changes. Each of the cartridges has at least one aperture in optical alignment with a film illumination means. A film drive is selectively connected to a capstan which is mounted for rotation outside the cartridge. The capstan frictionally engages an exposed portion of the film within the cartridge to drive the film past the aperture and the illumination means. The film may be provided in a continuous strip which is unwound or drawn from the center of the film reel and wound up on the outside of the same reel. More particularly, film such as 8 millimeter film and the like, capable of accommodating "stereo pairs" can be provided in a cartridge made according to the present invention for the projection of stereoscopic images. A film gate, also within the cartridge, directs the film past the cartridge aperture in alignment with the film illumination means.

The illumination means is in the form of a stroboscopic projection lamp which provides bursts of high frequency flashing light in timed relation with the passage of the film past the cartridge aperture. Each such burst illuminates the film and projects the film image onto a screen within the housing. While the bursts of flashing light are of high intensity, the low duty cycle of the stroboscopic lamp produces a low average value of heat emission and of operating temperature to thereby eliminate overheating as a cause of film and lamp deterioration.

Storage means, as for example, a magnetic sound track on the film strip, can be provided to record information for later sonic reproduction. Moreover, an electrically conducting deposit can be formed near the ends of the portion of the film strip to be projected to electrically activate a probe to the end of stopping or shifting the film drive and illumination means to another cartridge for continuous, uninterrupted projection.

As a modification of the invention, two or more film cartridges may be inserted within a housing in nested, side-by-side relation. A spline means may be interposed between the nested cartridges to selectively shift the film drive and film illumination means between the cartridges to project the film images in an individual sequence or together to produce special effects. In these instances, a shiftable mirror assembly may be provided to reflect the image projected from a selected driven film cartridge onto the screen. Moreover, to produce special photographic effects heretofore not possible in film viewing devices, a rapidly rotating mirror device or the like can be utilized to merge images projected from two or more film cartridges into one composite image.

For a better understanding of the present invention, reference may be had to the following description and to the accompanying drawings in which:

FIG. 1 is a front view of an exemplary embodiment of the film cartridge;

FIG. 2 is a side view of the film cartridge shown in FIG. 1;

FIG. 3 is a view in section of a film viewing device in which the cartridge of FIG. 1 is inserted, the view being taken along the line 3—3 of FIG. 4, looking in the direction of the arrows;

Figure 4:
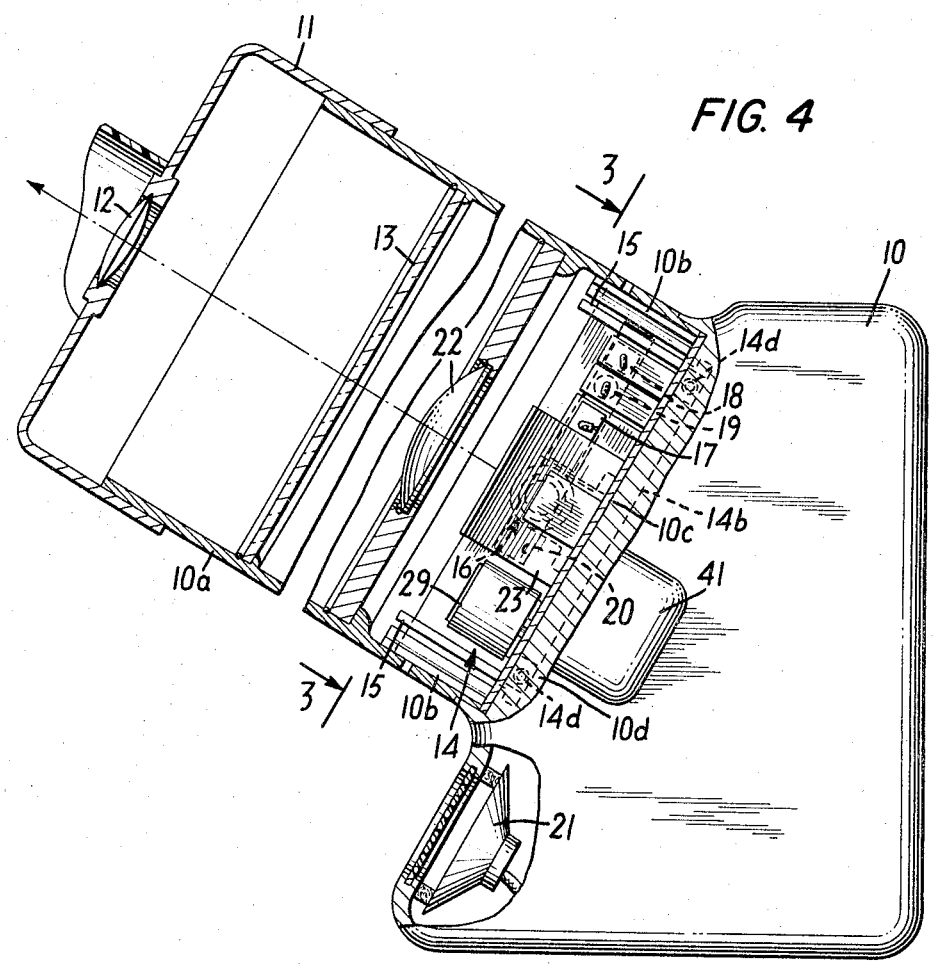
FIG. 4 is a side view in partial section, taken along the line 4—4 of the film viewing device shown in FIG. 3 and looking in the direction of the arrows.

Referring first to FIG. 4, a housing 10 provides a mounting for a hollow square viewing head 10a normally held in place by being slid onto a pair of guide strips 10b outstanding from a plate 10c mounted on an upward slanting face 10d of the housing. The head 10a is provided with a slidable cover 11 having eyepieces 12 adjustably focusable on a screen 13.

A film container, cartridge or capsule 14 (FIGS. 3 and 4) is releasably retained within the housing 10 in a manner as follows. The plate 10c has formed in its left hand end a wire rectangular notch 14a underlain by a wider rectangular notch 14b formed in the housing face 10d. The notch 14b forms a guideway for a slidable mounting block 14c biased forwardly in the guideway by a pair of springs 14d. Upstanding from block 14c are a pair of bars 15 having forwardly projecting shoulders or dogs 15a at their tops. The cartridge is inserted by detaching head 10a, sliding block 14c to the right by hand, positioning the cartridge within the receptacle formed therefor by housing 10 (FIG. 3), and then allowing block 14c to be driven left by springs 14d until bars 15 engage the side of the cartridge, and, also, dogs 15a overhang the rim of the cartridge to lock it in place. The head 10a is then replaced.

As shown, a focusing tube 16 with a focusing lens (not shown) on its inside is threadedly mounted in a bracket 16a on block 14c to be adjustably movable towards and away from cartridge 14 by knurling 16b. A transducer 17, a sensing probe 18 and a photoelectric cell 19 are also mounted on block 14c in alignment with an aperture 20 formed in the vertical edge of the cartridge 14 adjacent to the focusing tube 16. The housing 10 also includes a speaker 21, and a lens 22 (FIG. 4) optically aligned with and interposed between the screen 13 and a mirror 23 forming a part of the focusing means 16, to project film images on the screen 13. Mirror 23 is at 45° to the plane of the paper in FIG. 3.

Figure 8:
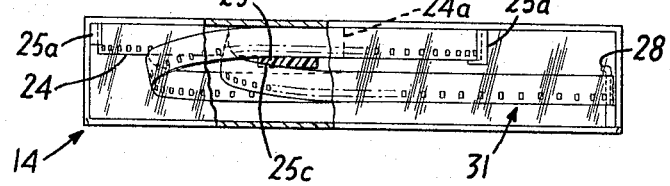
FIG. 8 is a plan view of the embodiment of the film cartridge shown in FIGS. 1 and 2.

The container or cartridge 14, shown in FIGS. 1, 2, and 8, is a flat container for convenient handling and storage having a width slightly greater than two widths of the strip of film contained therein to provide adequate clearance for lateral eccentricity of the continuous film strip. The cartridge 14 has a reel of film 24 loosely wound on a spool 24a of "Lucite" or the like. The spool 24a has a core 24b of "Teflon" (a synthetic resin based on tetrafluoroethylene polymers or the like) pivotally attached to the cartridge 14 by a spindle or a screw 24c so that the reel can rotate in the transverse plane of the paper as viewed in FIGURE 1. The film strip 31 is formed in a continuous strip which unwinds from and is wound back upon the same reel 24 by being drawn out of the plane of rotation of the film reel 24 and into alignment with the aperture 20 in the cartridge 14 in a manner to be subsequently described.

A well or recess 26 is formed in a horizontal side of the cartridge housing 14 which can accommodate a prism suitable to reflect light for illuminating and projecting the film images through the aperture 20 or, as shown in FIG. 3, a stroboscopic lamp 27 can be mounted in the housing 10 to provide directly the required film illumination.

A film gate 28, and a spring loaded idler roll 30 mounted within the cartridge 14 are arranged within the cartridge 14 adjacent to the aperture 20. The idler roll 30 presses a portion of the film strip 31 against a capstan 29 rotatably mounted in the housing 10 to draw the strip of film 31 from the center or innermost layer of film on the reel 24 adjacent to the spool 24a, over one edge of the gate 28, as seen in FIGS. 1 and 3, and between the gate 28 and the aperture in optical alignment with the stroboscopic light 27, the aperture 20 and the focusing means 16. The film strip 31 is driven by the capstan 29 which may be without the conventional sprockets or film claws, the capstan being formed of some resilient material, such as rubber or the like (to reduce film deterioration and prevent irregular motion of the film strip 31). After being driven, the film strip is wound back on the periphery of the reel 24 in a manner to be subsequently described. As shown, the capstan has a square hole 29a within which is received the square end of a shaft 29b driven by a motor 41 mounted on the underside of the face 10d of housing 10 (FIG. 4).

Light emitted by a low intensity incandescent bulb 32 is optically aligned with the film strip 31 and the photoelectric cell 19 to control the flashes of the stroboscopic lamp 27 illuminating the film strip in a manner to be hereinafter described. The light from the source 32 may be "bent" into alignment by an acrylic rod (not shown) or may be received within the well or recess 26 which receives the stroboscopic lamp 27. Or, as shown in FIG. 3, the light 32 is received in a recess 33 formed in the cartridge 14.

The loosely wound reel of film 24 is retained for rotation in the transverse plane by a stiff bar 25 which may be formed as an integral part of the cartridge 14 and fixed in the approximate transverse midplane of the cartridge 14 to the opposite longitudinal vertical edges of the cartridge 14.

The bar 25 has a working edge 25b formed on the side of the bar 25 disposed away from the capstan 29. A portion of the film strip 31 is drawn from the innermost layer of the reel 24 (adjacent to the spool 24a) by the capstan 29 in the manner previously described. Thereafter, the film strip passes through a shallow notch 25c formed in the upper surface of the working edge 25b of the bar 25. The notch 25c provides a guide which permits the capstan 29 and idler roll 30 to draw film strip 31 out of the plane of the film reel 24 and over the top of the gate 28 (FIG. 8) without binding or forming a kink in the portion of the film strip 31 being drawn off. The portion of the film strip 31 which has been projected and passed between the capstan 29 and roll 30 is fed, in a gentle curve, across the film reel 24 and over the upper surface of the bar 25 where it is forced, by the lower surface of the working edge 25b of the bar 25, back into the plane of the film reel 24 to form the outermost layer of film on the reel 24. Thus the bar 25 permits the film reel 24 to rotate freely in the transverse plane while the portions of the film strip 31 are drawn from the reel 24 and wound back on the reel 24 eccentrically without developing kinks or snarls.

The looseness and resiliency of the film reel 31 automatically adjusts the difference between the velocity with which the film strip 31 is unwound from the center of the reel 24 and the velocity with which the film strip 31 is fed back onto the periphery of the film reel 24 after projection. Thus the center of the loosely wound film reel 24 expands outwardly during rotation of the reel 24 while the periphery of the film reel 24 contracts to accommodate the velocity differences. Moreover, as a consequence of this arrangement within the cartridge 14, no film guides or the like are necessary other than the film gate 28 already described.

The outer periphery of the film reel 25 is confined by the vertical walls of the cartridge 14. Spacers 25a may be used, however, as shown in FIGS. 1 and 3 if it is desired to make the cartridge somewhat larger than the particular film reel 24 diameter.

To reduce friction between the film reel 24, the cartridge 14 and the notched bar 25, grooves may be provided on the surface of the cartridge 14 and bar 25 contacting the film reel 24, or, as shown in FIGS. 1 and 3, strips 25d of a material having an extremely low coefficient of friction, such as "Teflon" or the like, may be provided to prevent frictional forces from causing the film strip 31 to kink or bind and thus interrupt the sequential projection of the images on the film strip 31.

Thus the film cartridge 14 provides a structure having smaller dimensions than standard film reels without, moreover, requiring the usual film guides and the like. Cartridges made according to the present invention can be packed, stored and used as compact assemblies having an eccentric film feed for use in film viewing and motion picture projection devices.

Figure 7:
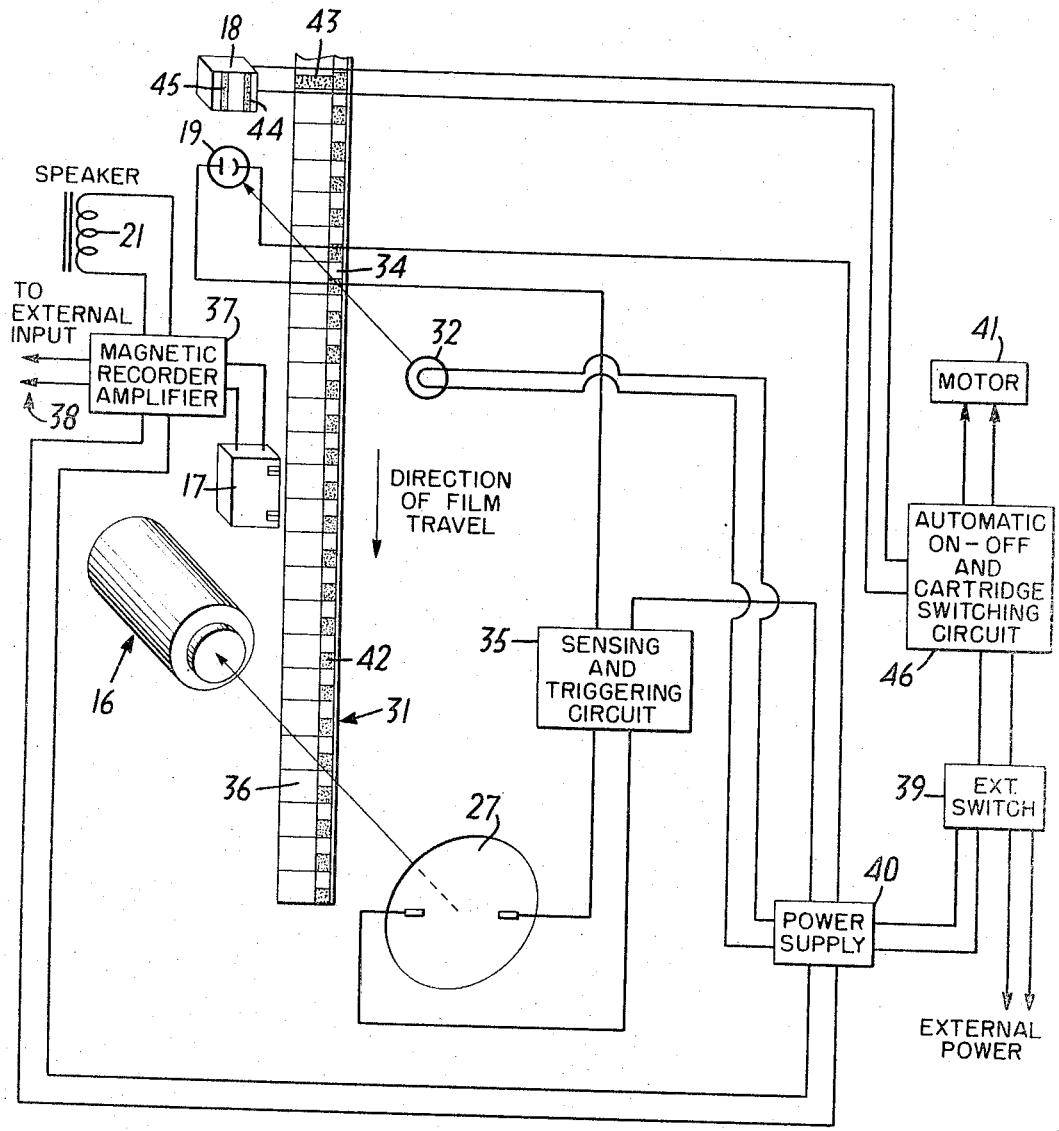
FIG. 7 is a schematic diagram of the electrical circuits incorporated in FIG. 4 embodiment.

As shown in FIG. 7, illumination from the light source 32 projects through transparent portions 34 of the film strips 31 (which can be conventional claw apertures) and the aperture 20 formed in the cartridge 14 (FIG. 3) to energize the photoelectric cell 19. The energization of the photoelectric cell 19 causes a conventional sensing and triggering circuit 35 to extinguish the stroboscopic light 27 in measured relationship with the passage of film frames 36 between the focusing means 16 and the stroboscopic light 27.

The stroboscopic lamp 27 and the focusing tube 16 are positioned within the housing 10 next to the capstan 29 as shown in FIG. 3. However, it may be more convenient to place the sound storage and reproduction transducer 17 next to the capstan 29 so the portion of the film being scanned by the transducer 17 will be in maximum tension. The sound storage and reproduction transducer can be provided with any conventional film sound storage and reproduction system, as, for example, a magnetic recorder and amplifier 37 (FIG. 7).

Thus the invention may be practiced with the magnetic recorder and amplifier combination 37 adapted to activate and respond to a conventional, erasable, magnetic sound track (not shown) on the film strip 31. The transducer 17 is a conventional record-play-erase head which can magnetically record on, erase or reproduce from the sound track. When reproducing, the signal from head 17 may be converted into sound by the speaker 21.

In operation, the cartridge 14 is inserted as described into the housing 10 so as to be in alignment with the focusing means 16. The capstan 29 is rotated by motor 41 to drive the film 31 past the cartridge aperture 20 and the stroboscopic lamp 27 to project the film image through the focusing means 16, mirror 23 and lens 22 onto the screen 13. The eyepieces 12 are focused on the screen 13 by adjusting the distance between the slidable cover 11 and the screen 13 to further aid film image observation.

An external switch 39 may be manually turned on to provide electrical power from a conventional power supply 40 to energize the film viewer. The power supply 40 activates the motor 41 to turn the capstan 29 and drive the film 31 past the cartridge aperture 20. Opaque portions 42 are formed on the film 31 in measured relationship with the passage of the film frames 36 past the focusing means 16 to interrupt the luminous activation of the photoelectric cell 19 by the light source 32 and to cause the sensing and triggering circuit 35 to initiate a burst of illumination from the stroboscopic lamp 27 to project the film image through the focusing means 16.

Thus the flashing stroboscopic light 27 provides a low temperature source of high intensity illumination to project the film image.

As the end of the portion of the film strip 31 to be projected is approached, an electroconductive deposit 43, formed near the end of a frame sequence to be projected, closes an electrical circuit between two conductors 44 and 45 on the sensing probe 18. Closing the circuit in the sensing probe 18 provides a signal for a conventional, automatic on-off switching circuit 46 to stop the motor 41 and de-energize the film-viewing device or to shift the operation of the apparatus to a similar film cartridge in the manner hereinafter described.

Figure 5:
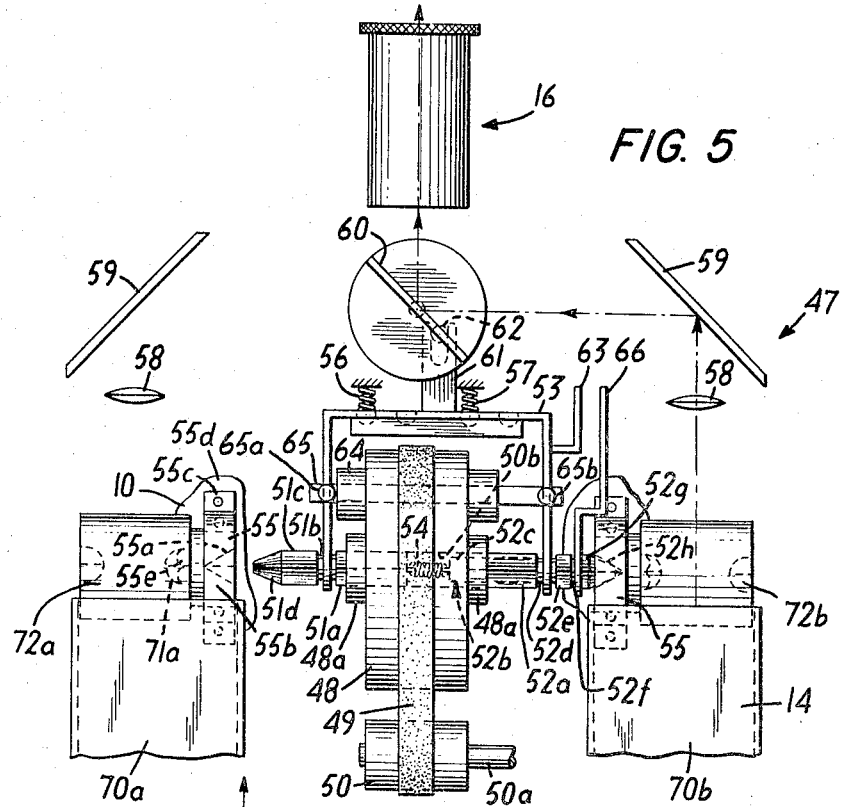
FIG. 5 is a plan view partly in section of a portion of a spline drive for two film cartridges according to the present invention.
Figure 6:
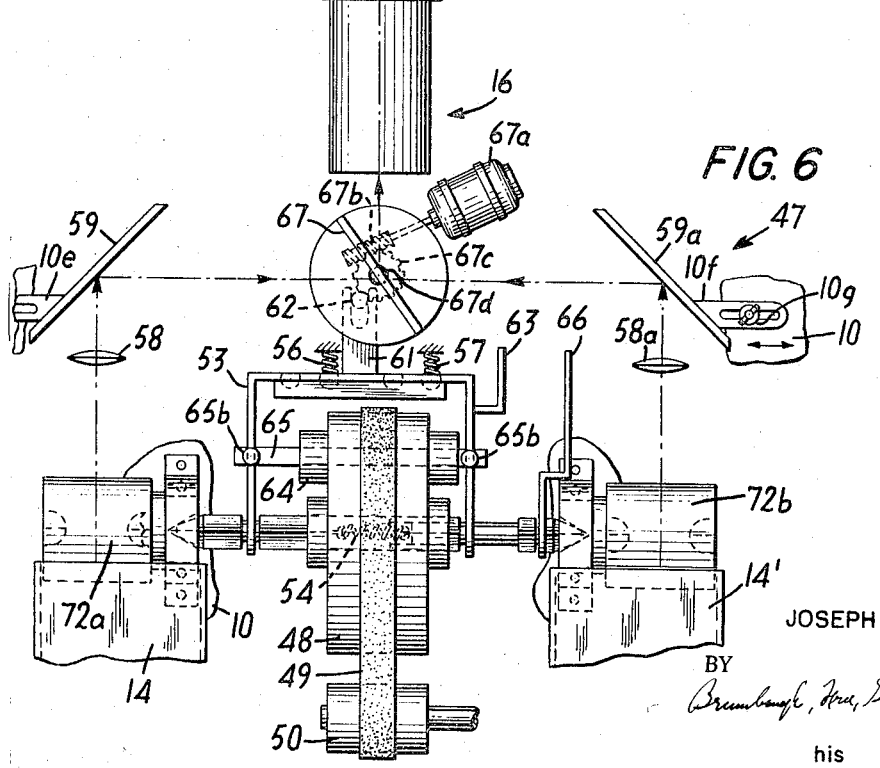
FIG. 6 is a plan view partly in section of a modification of the embodiment shown in FIG. 5.

A modification of the invention, providing for special visual effects or for the uninterrupted projection of several reels of film in sequence from a conventional motion picture projector or within a film viewer of the type described, uses spline means 47 shown in FIGS. 5 and 6.

In FIG. 5, a driven pulley 48 has hubs 48a journaled in bearing means (not shown). Pulley 48 is driven by a belt 49 which in turn is driven by a pulley 50 connected by shaft 50a to motor 41.

The pulley has extending axially therethrough a hole 50b of square cross section. Received within a sliding fit in this hole is one end of a left hand spline assembly comprised from right to left of a square shaft 51a, a rounded reduced diameter shaft portion or groove 51b and a radially enlarged portion 51c having a tapered four-sided pyramidal end 51d. On the right hand side of the pulley 48 is another spline assembly comprised of an outer square shaft 52a having one end received with a sliding fit in square hole 50b. Coaxial with shaft 52a is a smaller inner shaft 52b having a length 52c of square radial cross section received with a sliding fit in a square axial hole in outer shaft 52a. Shaft 52b also has from left to right a rounded, reduced diameter section 52d outside shaft 52a, an enlargement 52e, a rounded reduced diameter section 52f and another enlargement 52g having a tapered four-sided pyramidal end 52h.

The left and right hand spline assemblies are interconnected by a yoke 53 extending around the driven pulley 48 and having bifurcated ends of which one fits around rounded shaft section 51b of the left hand assembly and the other fits around rounded shaft section 52d of the right hand assembly. The ends of the square shaft 51a of the left hand assembly and of the inner shaft 52b of the right hand assembly are interconnected by a spring 54.

The pyramidal end 51d of the left hand spline assembly is adapted to be received in a matching pyramidal recess 55a of a drive disc 55b mounted in a bearing 55c on one side of a housing wall 55d of which the other side forms part of the receptacle for a left hand film cartridge 70a. Projecting outwardly from disc 55b and through a hole in wall 55d is a square drive pin 55e received with a mating fit into the square drive hole 71a of the capstan 72a associated with the cartridge 70a. In this manner, rotation of the left hand spline assembly is adapted to produce rotation of the capstan 72a. In like manner, the right hand spline assembly is adapted by way of its tapered end 52h, etc. to drive the capstan 72b associated with a right hand film cartridge 70b.

Either one of the cartridges 70a and 70b may be driven by shifting the yoke 53 selectively to the left or to the right, the yoke being adapted to be held in either position by spring loaded ball detents 56 and 57. The spline 47 may also be provided with two prisms (not shown) movable with the yoke 53. Each of the prisms is in alignment with an illumination means or stroboscopic lamp 27 so that the source of film illumination will be shifted simultaneously with the drive means from the projected cartridge to the next cartridge in the film sequence to be projected. The film image illuminated by the shiftable prism (not shown) moving with the yoke is projected from the driven cartridge in the manner hereinbefore described. The projected film image passes through a lens 58 and is reflected from a stationary mirror 59 to a rotatable mirror 60 which has been silvered on both sides and is pivoted to the housing 10. The image reflected from the rotatable mirror 60 is projected through the focusing means 16 to the screen 13, or, in the case of a conventional motion picture projector, through the focusing tube 16 to a motion picture screen (not shown).

A link 61, fixed to the yoke 53, engages a detent on the rotatable mirror 60 to position the rotatable mirror 60 to receive and reflect the film image being projected from that one of the cartridges which is being driven.

A lever 63 is provided on the yoke 53 to provide a means for manually selecting the cartridge to be driven by the spline assemblies. Automatic shifting of the spline assemblies can be accomplished by a solenoid 64 disposed below pulley 48 and linked to the yoke 53 by an armature 65 and rods 65a, 65b extending upwards from the ends of the armature to the yoke. The solenoid 64, activated by the circuit (FIG. 7) established through the sensing probe 18, and the electroconductive deposit 43 on the film 31, produces a selective engagement between the left hand spline assembly and left hand cartridge or between the right hand spline assembly and right hand cartridge.

Moreover, as a further refinement, shown in FIG. 6, a lever 66 can be used to override the force of the spring 54 to allow the film in both cartridges to be driven simultaneously.

Images from the film illuminated within the cartridges 14 and 14' (FIG. 6) are projected through an optical assembly which may comprise a prism assembly or, as shown in FIG. 6, the lenses 58 and 58a and aligned mirrors 59 and 59a which are disposed at a 45° angle to the plane of the projected images. The mirrors 59 and 59a are mounted for sliding movement in a plane perpendicular to the plane of the projected image on portions of the housing 10 by slotted bars 10e and 10f which connect the non-reflecting sides of the mirrors 59 and 59a with the housing 10 by means of wing nuts 10g, or the like. The sliding adjustment of the mirrors 59 and 59a is provided to afford means for causing the images projected from the cartridges 14 and 14' to appear to merge by eliminating a failure of the two images to naturally appear to merge by reason of the intervening thickness of a mirror 67. Thus the two projected images can be reflected into the mirror 67, silvered on both sides, which is rotated by a motor 67a through a worm 67b and a pinion gear 67c keyed to a vertical shaft 67d which supports the mirror 67 for rotation thereon. The link 61 can be fixed to the yoke 53 so that the link 61 can be disengaged from the detent 62 by pivoting downwardly, thus to permit the motor 67a to drive the mirror (as described) to project an apparently merged image through the focusing means 16. Thus the images from the two cartridges are reflected from the rapidly rotating mirror 67 to produce the optical effect of an apparent merging to produce a single image.

As is apparent from the foregoing, the present invention provides for a film viewer, a low temperature film illumination means and novel features enabling rapid film insertion and removal and the production of special sensory effects without the usual tedious threading of the film through sprockets and the like.

While representative embodiments of the present invention have been shown and described for purposes of illustration, various changes and modifications can be made therein as pointed out above without departing from the principles of this invention. Therefore, all such changes and modifications are included within the intended scope of the invention as defined by the following claims.

I claim:
1. A film viewing device for a film bearing indicia of each frame thereon, comprising a housing, a film illumination means including a stroboscopic light source provided within the housing, means for detecting the film frame indicia and triggering the stroboscopic light source to project each frame image in sequence, a cartridge having at least one aperture in optical alignment with the film illumination means, said cartridge being insertable within the housing for communication with said film illumination means, a film drive operatively associated with the viewing device, a film reel rotatably mounted within said cartridge having a continuous film strip, a capstan rotatably mounted outside the cartridge and adjacent to said aperture for driving cooperation with said continuous film strip and said film drive by drawing the film strip portion to be viewed from the innermost layer of film in said reel and feeding the viewed film portion back on the outermost layer of film in said reel, said reel being loosely wound to accommodate variations in film velocity between said innermost layer and said outermost layer of film, spline means cooperatively engaging the capstan with the film drive to run the film strip continuously at a substantially constant speed in one direction, a film gate within the cartridge adjacent to said cartridge aperture adapted to optically align the film with said cartridge aperture and said film illumination means, screen means within said housing in optical alignment with the film illumination means and said cartridge aperture for receiving the film image thereon, and focusing means interposed in optical alignment between the screen means and said cartridge aperture for projecting the film image therebetween.

2. A film viewing device according to claim 1 wherein said means for triggering said stroboscopic film illumination means, includes a continuous light source in optical alignment with said cartridge aperture for the passage of light from said light source therethrough, photoelectric means in said housing adjacent to said cartridge aperture and in alignment with said light source for electrical activation thereby, a portion of said film guide optically interposing the film between said light source and said photoelectric means the film indicia being constituted by, opaque portions on the interposed film formed therein in measured relationship with the passage of the film for electrical deactivation of said photoelectric means, an electrical switch operatively connected between said photoelectric means and said first illumination means for activating said stroboscopic illumination means in response to said photoelectric cell activation.

3. A film viewing device, comprising a housing, illumination means within the housing for projecting the film image, two or more containers insertable within the housing in a nested side-by-side relation each of said containers having at least one aperture, illumination alignment means within each of the containers for optically aligning said respective container aperture with the illumination means, a film reel having a continuous film strip rotatably mounted within each of said containers, a capstan rotatably mounted outside each of said containers adjacent to said aperture for driving cooperation with said respective continuous film strip by drawing the film strip portion to be viewed from the innermost layer of film in said reel and feeding the viewed film portion back to the outermost layer of film in said reel, said reel being loosely wound to accommodate variations in the film velocity between said innermost layer and said outermost layer of film to selectively run the film in each of the containers continuously in one direction, a film drive operatively associated with the viewing device, spline means interposed between the nested containers and adapted to selectively connect one of said capstans in driven relation with said film drive, a film gate within each of the containers adjacent to the respective container apertures adapted to optically align the film with said container aperture and said illumination alignment means, a reflector assembly movable into optical alignment with the container aperture and the optical means to reflect the projected driven film image therefrom, screen means within said housing in optical alignment with the reflecting assembly for receiving the film image thereon and focusing means interposed in optical alignment between the screen means and the container aperture for projecting the film image therebetween.

4. A film viewing device according to claim 3 including a transverse bar spaced substantially in the midplane of each of said containers and in engagement with a flank of said film reel, said bar having a working edge across which said film strip portion to be viewed is drawn by said capstan and said viewed film strip portion is fed onto the outermost layer of film on said reel.

5. A film viewing device according to claim 4 including a notch formed in the working edge of said bar on the side of said bar disposed away from the flank of said film and adjacent to the innermost layer of film for aligning said film strip portion to be viewed with said film gate.

6. A film viewing device according to claim 3 including drive pins in aligned interposition between each of said capstans and said spline means for selective engagement therewith, a yoke adapted to selectively shift said spline means into engagement with one of the drive pins for operative connection with the respective capstan.

7. A film viewing device according to claim 6 wherein said yoke selectively shifts said illumination alignment means into optical alignment with the film strip being driven.

8. A film viewing device according to claim 6 including a solenoid adapted to selectively engage the spline means with the respective drive pins.

9. A film viewing device according to claim 6 including a portion of the reflector assembly operatively connected to said yoke for pivotal movement therewith into optical alignment with said illumination alignment means and the driven film for reflecting the film image projected therefrom.

10. A film viewing device according to claim 9 including lever means adapted to selectively engage said spline means with all of said drive pins for operative connection with each of said respective capstans.

11. A film viewing device, comprising a housing, illumination means within the housing for projecting film images, at least two containers insertable within the housing in a nested side-by-side relation, each having at least one aperture, illumination alignment means within each of the containers for optically aligning said respective container apertures with the illumination means, a film reel having a continuous film strip rotatably mounted with each of said containers, a capstan rotatably mounted outside each of said containers and adjacent to said aperture for driving cooperation with said continuous film strip by drawing the film strip portion to be viewed from the innermost layer of film in said reel and feeding the viewed film portion back to the reel on the outermost layer of film in said reel, said reel being loosely wound to accommodate variations in speed between said innermost layer and said outermost layer of film, a film drive operatively associated with the viewing device, spline means interposed between the nested containers and adapted to connect said capstans in driven relation with said film drive, a film gate within each of the containers adjacent to the respective container apertures adapted to optically align the film with said respective container aperture and said respective illumination alignment means, an optical assembly optically aligned with said container apertures and said illumination alignment means for merging the projected film images, screen means within said housing in optical alignment with the optical assembly for receiving the merged film image thereon, and focusing means interposed in optical alignment between the screen means and the reflecting assembly for projecting the film image therebetween.

12. A film viewing device according to claim 11 wherein said optical assembly comprises a pair of mirrors in alignment with and inclined to the plane of image projection from said containers, slotted means for adjusting the alignment of said mirrors in a plane perpendicular to the plane of image projection, and rotatable mirror means interposed in optical alignment between said pair of mirrors for the apparent merging of images projected thereon.

13. A film viewing device according to claim 11 including a prism assembly in said optical assembly for merging the film images projected from each of the containers.

14. A film viewing device according to claim 11 wherein said film illumination means includes a source of continuous illumination, a photoelectric cell activated by the course of illumination, switch means operatively connected to said photoelectric cell, a stroboscopic lamp activated by said switch means, and a plurality of opaque portions on the film, said opaque portions on the film being spaced in measured relationship with the passage of the film before the stroboscopic lamp for interrupting the activation of said photoelectric cell.

15. A film viewing device according to claim 11 wherein said optical assembly includes a rotatable mirror silvered on both sides in optical alignment with the projected film images, and means for rotating said mirror in the plane of film image projection to apparently merge the projected film images.

16. A film viewing device according to claim 15 including means for compensating for the thickness of said intervening rotatable mirror.

17. A film viewing device according to claim 11 wherein said spline means includes a plurality of drive pins having shafts, a yoke interconnecting said plurality of drive pins for the selective shifting of said pins, detent means for releasably engaging said yoke and said drive pins in said shifted position, biasing means interconnecting said drive pin shafts, and lever means on at least one of said drive pins for selectively shifting said drive pin independently of said yoke and against said biasing means.

18. A film viewing device according to claim 17 further comprising a link operatively engaged with said yoke and rotatable mirror means having a detent thereon adapted to engage said link for relative movement therewith.

References Cited by the Examiner

UNITED STATES PATENTS

| | | | |
|---|---|---|---|
| 1,156,903 | 10/1915 | Johnston | 192—48 |
| 2,006,213 | 6/1935 | Halliday | 352—133 |
| 2,123,495 | 7/1938 | Becker | 352—78 |
| 2,137,601 | 11/1938 | Abrams | 352—78 |
| 2,211,218 | 8/1940 | Serrurier | 352—129 X |
| 2,213,664 | 9/1940 | Berg | 352—133 |
| 2,434,201 | 1/1948 | Engelken | 352—123 |
| 2,568,734 | 9/1951 | Heyer | 352—123 |
| 2,624,232 | 1/1953 | Kingston | 352—83 |
| 2,770,939 | 11/1956 | Berg et al. | 192—48 |
| 3,028,790 | 4/1962 | Wade | 88—24 X |
| 3,039,022 | 6/1962 | D'Arcy. | |
| 3,176,310 | 3/1965 | Finnerty | 352—29 |
| 3,212,837 | 10/1965 | Beyer | 352—72 |

JULIA E. COINER, *Primary Examiner.*